(12) United States Patent
Hanks et al.

(10) Patent No.: US 8,019,903 B2
(45) Date of Patent: Sep. 13, 2011

(54) REMOVABLE ACCESSORY FOR A COMPUTING DEVICE

(75) Inventors: Richard Hanks, Seattle, WA (US); Alistair Hamilton, Sammamish, WA (US); Rinat Aruh, New York, NY (US); Johan Carl Liden, New York, NY (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 12/412,397

(22) Filed: Mar. 27, 2009

(65) Prior Publication Data

US 2010/0250794 A1  Sep. 30, 2010

(51) Int. Cl.
*G06F 3/01* (2006.01)
(52) U.S. Cl. .................. 710/2; 710/72; 710/73
(58) Field of Classification Search .................. None
See application file for complete search history.

(56) References Cited

U.S. PATENT DOCUMENTS

| | | | |
|---|---|---|---|
| 5,930,351 A | 7/1999 | Lappen et al. | |
| 6,665,741 B1 * | 12/2003 | Bronson | 710/8 |
| 6,757,551 B2 * | 6/2004 | Newman et al. | 455/556.1 |
| 6,933,923 B2 * | 8/2005 | Feinstein | 345/158 |
| 7,003,328 B2 * | 2/2006 | Kuwazoe | 455/566 |
| RE39,003 E * | 3/2006 | Orr et al. | 348/564 |
| 7,047,339 B2 * | 5/2006 | Oakley | 710/303 |
| 7,197,584 B2 * | 3/2007 | Huber et al. | 710/72 |
| 7,221,331 B2 * | 5/2007 | Bear et al. | 345/1.1 |
| 7,403,598 B2 | 7/2008 | Tyroler et al. | |
| 7,443,971 B2 * | 10/2008 | Bear et al. | 379/210.01 |
| 7,502,221 B2 * | 3/2009 | Fuller et al. | 361/679.55 |
| 7,511,682 B2 * | 3/2009 | Fuller et al. | 345/1.1 |
| 7,558,884 B2 * | 7/2009 | Fuller et al. | 709/248 |
| 7,577,429 B2 * | 8/2009 | Bear et al. | 455/426.1 |
| 7,577,771 B2 * | 8/2009 | Steeb et al. | 710/20 |
| 7,581,034 B2 * | 8/2009 | Polivy et al. | 709/250 |
| 7,656,652 B2 * | 2/2010 | Moser | 361/679.27 |
| 7,693,546 B1 * | 4/2010 | Gioscia et al. | 455/556.1 |
| 7,711,868 B2 * | 5/2010 | Rhoten et al. | 710/15 |
| 7,747,970 B2 * | 6/2010 | Sanchez et al. | 715/864 |
| 2002/0086711 A1 * | 7/2002 | Flannery | 455/566 |
| 2004/0019724 A1 * | 1/2004 | Singleton et al. | 710/303 |
| 2004/0233930 A1 * | 11/2004 | Colby, Jr. | 370/464 |
| 2004/0250276 A1 * | 12/2004 | Cana et al. | 725/37 |

(Continued)

FOREIGN PATENT DOCUMENTS

JP 2002335567 A * 11/2002

(Continued)

OTHER PUBLICATIONS

Jose Fermoso, CMU Using GPS and Accelerometer Systems to Improve Football Officiating, Jan. 2009, retrived from http://www.wired.com/gadgetlab/2009/01/students-using/.*

(Continued)

*Primary Examiner* — Cheng-Yuan Tseng

(57) ABSTRACT

An accessory computing device or display detachable from another computing device such as a mobile computing device. The accessory computing device displays data from the mobile computing device including notifications relating to electronic mail messages, voice mail messages, stock prices, sports scores, etc. A user interacts with the accessory computing device to control the mobile computing device by, for example, replying to messages, controlling a game executing on the mobile computing device, or silencing a ringer on the mobile computing device. In some embodiments, a plurality of the accessory computing devices interact with the same mobile computing device (e.g., in a multiplayer game or device location tracking application executing on the mobile computing device).

18 Claims, 11 Drawing Sheets

U.S. PATENT DOCUMENTS

| | | | |
|---|---|---|---|
| 2005/0066209 A1* | 3/2005 | Kee et al. | 713/323 |
| 2005/0262302 A1* | 11/2005 | Fuller et al. | 711/119 |
| 2006/0123053 A1* | 6/2006 | Scannell, Jr. | 707/104.1 |
| 2006/0130072 A1* | 6/2006 | Rhoten et al. | 719/321 |
| 2006/0183505 A1 | 8/2006 | Willrich | |
| 2006/0204092 A1* | 9/2006 | Hamasaka et al. | 382/173 |
| 2006/0238439 A1* | 10/2006 | Fuller et al. | 345/1.1 |
| 2006/0238497 A1* | 10/2006 | Velagapudi | 345/156 |
| 2006/0242590 A1* | 10/2006 | Polivy et al. | 715/760 |
| 2006/0267859 A1* | 11/2006 | Lin et al. | 345/1.1 |
| 2007/0010289 A1* | 1/2007 | Mezue | 455/557 |
| 2007/0064400 A1* | 3/2007 | Morisawa | 361/724 |
| 2007/0080931 A1 | 4/2007 | Chen et al. | |
| 2007/0091096 A1* | 4/2007 | Wang et al. | 345/501 |
| 2007/0219655 A1 | 9/2007 | Erickson et al. | |
| 2008/0119179 A1 | 5/2008 | Lay et al. | |
| 2008/0165144 A1* | 7/2008 | Forstall et al. | 345/173 |
| 2008/0167535 A1* | 7/2008 | Stivoric et al. | 600/301 |
| 2008/0266205 A1* | 10/2008 | Moehring | 345/1.2 |
| 2008/0273297 A1* | 11/2008 | Kumar | 361/680 |
| 2008/0304688 A1* | 12/2008 | Kumar | 381/370 |
| 2009/0003564 A1 | 1/2009 | Martin | |
| 2009/0124308 A1* | 5/2009 | Lee | 455/575.3 |
| 2009/0149106 A1* | 6/2009 | D'Alleva et al. | 446/8 |
| 2009/0149217 A1* | 6/2009 | Adiseshann et al. | 455/556.2 |
| 2009/0185792 A1* | 7/2009 | Braunstein et al. | 386/117 |
| 2010/0033916 A1* | 2/2010 | Douglas et al. | 361/679.28 |
| 2010/0197352 A1* | 8/2010 | Runstedler et al. | 455/566 |

FOREIGN PATENT DOCUMENTS

JP     20075915 A * 11/2007

OTHER PUBLICATIONS

"Fike Corporation", "Fike Cybercat 1016 Intelligent Fire Alarm Control System", retrieved at <<http://www.firefire.com/library/Fike-d.1.08.01.pdf>>, Dec. 2005, pp. 1-8.

* cited by examiner

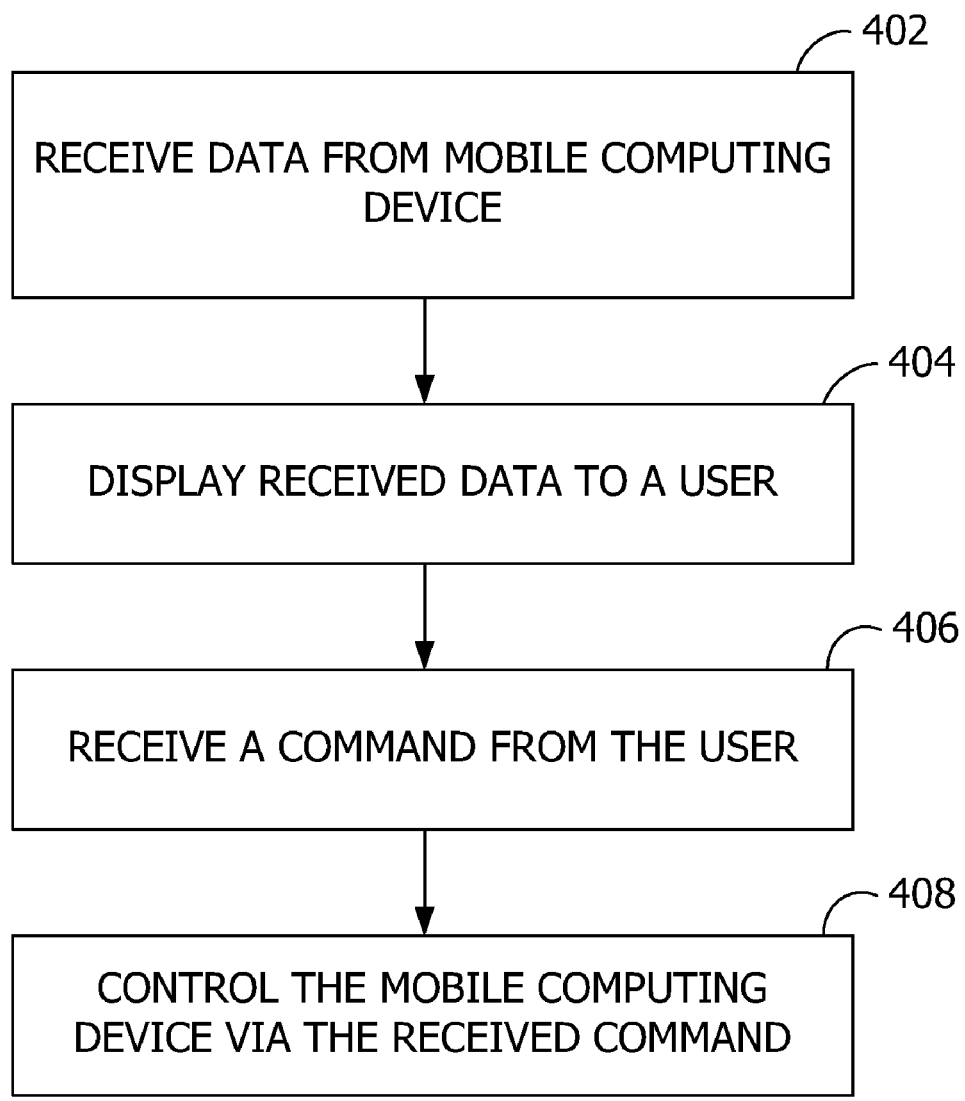

FIG. 8
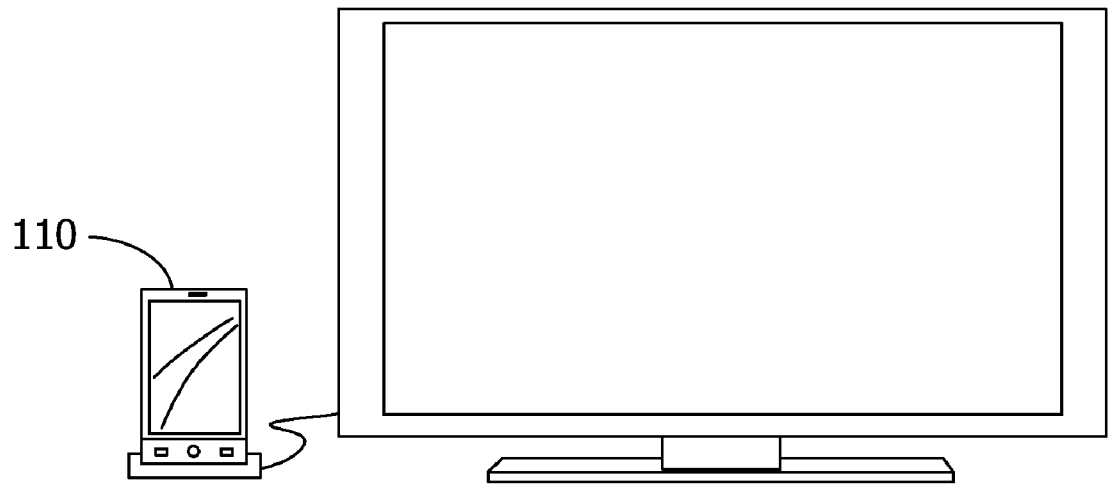
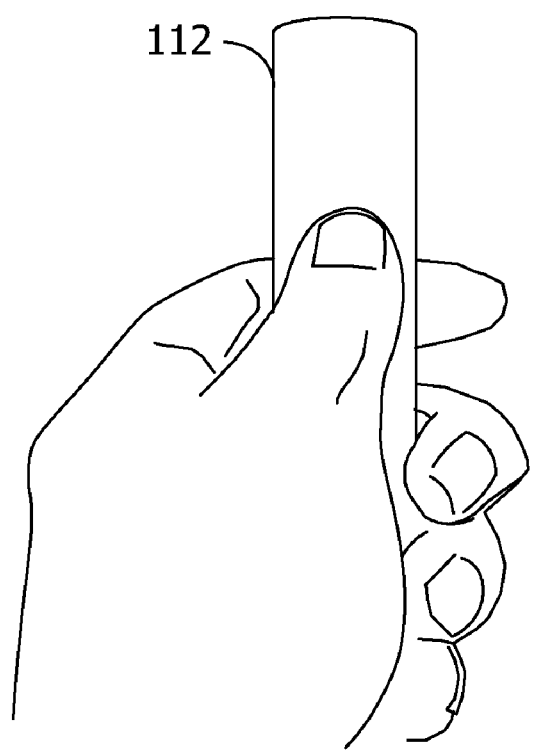

FIG. 10
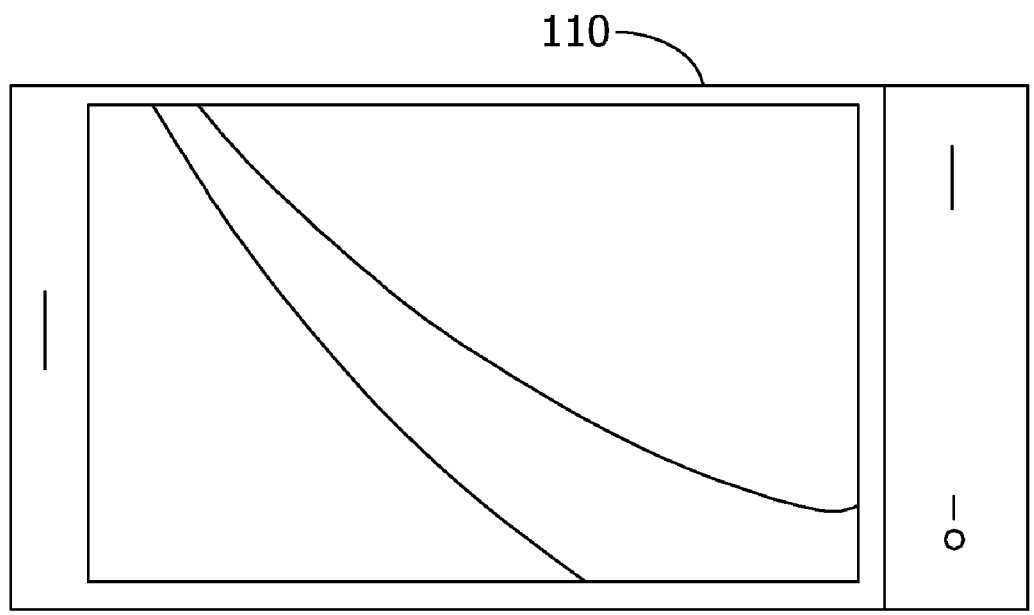
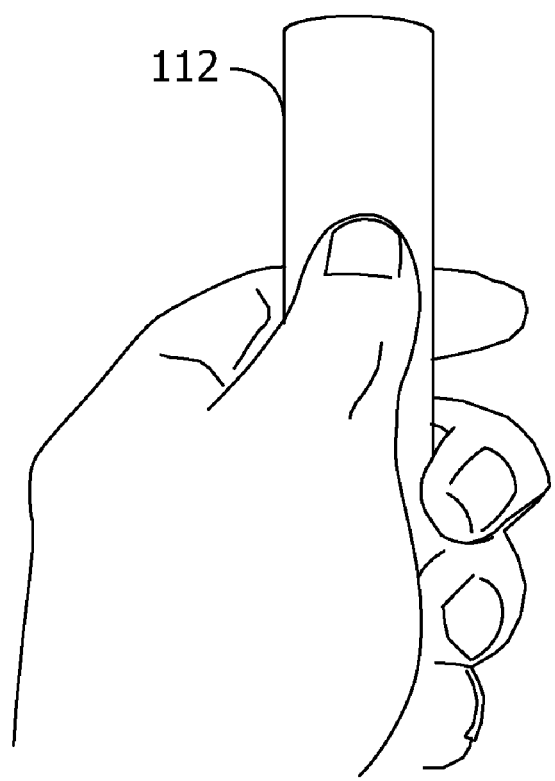

REMOVABLE ACCESSORY FOR A COMPUTING DEVICE

BACKGROUND

Mobile computing devices such as cell phones are ubiquitous in personal and business settings. Advances in design and computing capabilities of such devices serve as a catalyst for demanding more access to these capabilities by consumers. Unfortunately, accessing a mobile computing device to merely check the time, review notifications, or read/respond to an e-mail or text may be deemed as inappropriate in some settings (e.g., at a business meeting or a dinner). In addition to being inappropriate, accessing the mobile computing device may be inconvenient for the user. For example, the mobile computing device may be in a briefcase or a purse and therefore not easily accessible.

Further, a user may also have to awaken the mobile computing device and/or unlock the mobile computing device to check the time, review notifications, or read/respond to an e-mail or text, which not only creates a distraction and visual disturbance to others nearby, but also drains the battery on the mobile computing device.

SUMMARY

Embodiments of the disclosure enable an accessory computing device to detach from and control another computing device. The accessory computing device receives data from the computing device and displays the received data to a user of the computing device. While detached, the accessory computing device receives a command from the user and communicates with the computing device to control the computing device based on the received command.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is an exemplary flow chart illustrating communication between a mobile computing device and an accessory computing device.

FIG. 8 is an illustrative example of the accessory computing device being used to control an external monitor.

FIG. 10 is an illustrative example of the accessory computing device communicating with the mobile computing device utilizing an accelerometer.

Corresponding reference characters indicate corresponding parts throughout the drawings.

DETAILED DESCRIPTION

Figure 1:
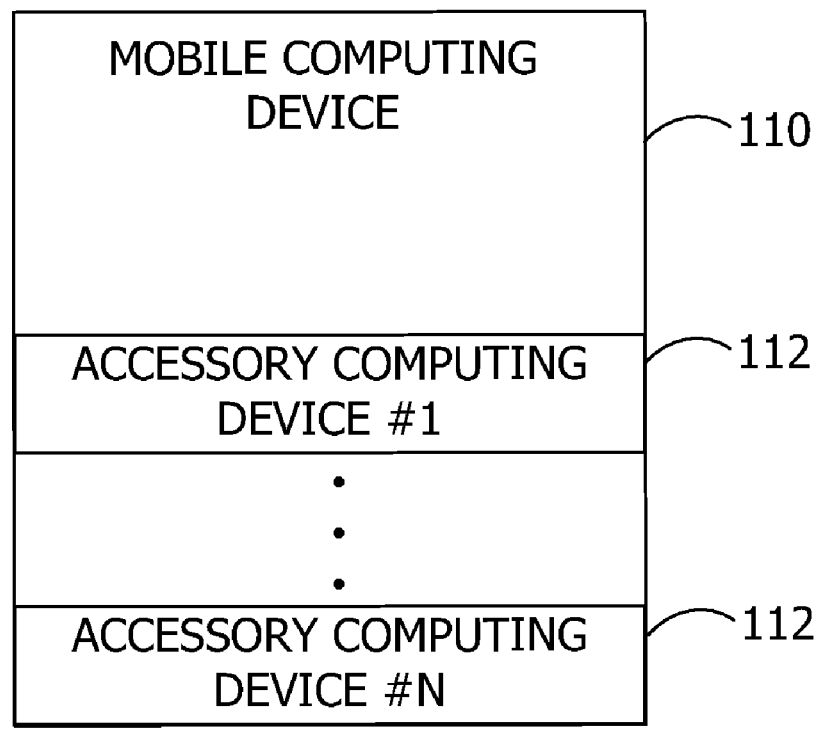
FIG. 1 is an exemplary block diagram illustrating an accessory computing device detached from another computing device and communicating with the other computing device.

Referring to the figures, embodiments of the disclosure enable a computing device, such as mobile computing device 110 in FIG. 1, to communicate with one or more accessory computing devices 112 such as accessory computing device #1 through accessory computing device #N, or other detachable auxiliary device. The accessory computing device 112 is removably attached to mobile computing device 110. In embodiments, accessory computing device 112 connects to mobile computing device 110 on a top, a bottom, or a side of mobile computing device 110. See FIG. 5 and FIG. 6 for illustrative examples of connections between accessory computing device 112 and mobile computing device 110. Alternatively or in addition, accessory computing device 112 may slide into or out of mobile computing device 110, or clip or stick on the surface of mobile computing device 110. In embodiments, accessory computing device 112 includes a rechargeable battery (not shown) that is configured to recharge while attached to mobile computing device 110.

The removable accessory computing device 112 the user to, for example, glance at the time, notifications, messages, or other content while the accessory computing device 112 is away from the mobile computing device 110. Further, the accessory computing device 112 enables the user to control the mobile computing device 110 or other computing device. The accessory computing device 112 enables such activities without powering on a display of the mobile computing device. In some embodiments, the accessory computing display 112 is configured to clip to any article (e.g., clothing, purse, dashboard, automobile sun visor, or hat brim) or be placed on a table in front of the user. The accessory computing device 112 communicates with the mobile computing device 110 to allow the user to, for example, respond to a notification or silence the mobile computing device. Additionally, in embodiments in which a display on the accessory computing device 112 draws less power than a display on the mobile computing device 110, using the accessory computing device 112 saves battery power of the mobile computing device 110.

While embodiments of the disclosure are illustrated and described herein with reference to the mobile computing device 110 such as a mobile telephone, aspects of the disclosure are operable with any computing device that performs the functionality illustrated and described herein, or its equivalent. For example, embodiments of the disclosure are operable with a laptop, embedded device, personal digital assistant, gaming console, desktop computing device, and other portable and non-portable computing devices capable of hosting and/or connecting to the accessory computing device 112.

Further, while detached, the accessory computing device 112 may communicate with the mobile computing device 110 via any known short- or long-range communication mechanisms. For example, the accessory computing device 112 may communicate with the mobile computing device 110 via BLUETOOTH brand networks, short message service (SMS) messages, wireless fidelity (Wi-Fi) or any other wireless or radio frequency communication mechanisms. In embodiments in which the accessory computing device 112 includes a cellular radio, the accessory computing device 112 communicates with the mobile computing device via mobile telephony protocols such as global system for mobile communications (GSM), 3G mobile communication technology, code division multiple access (CDMA), and universal mobile telecommunications system (UMTS). The accessory computing device 112 may also include an interface to receive satellite signals.

Figure 2:
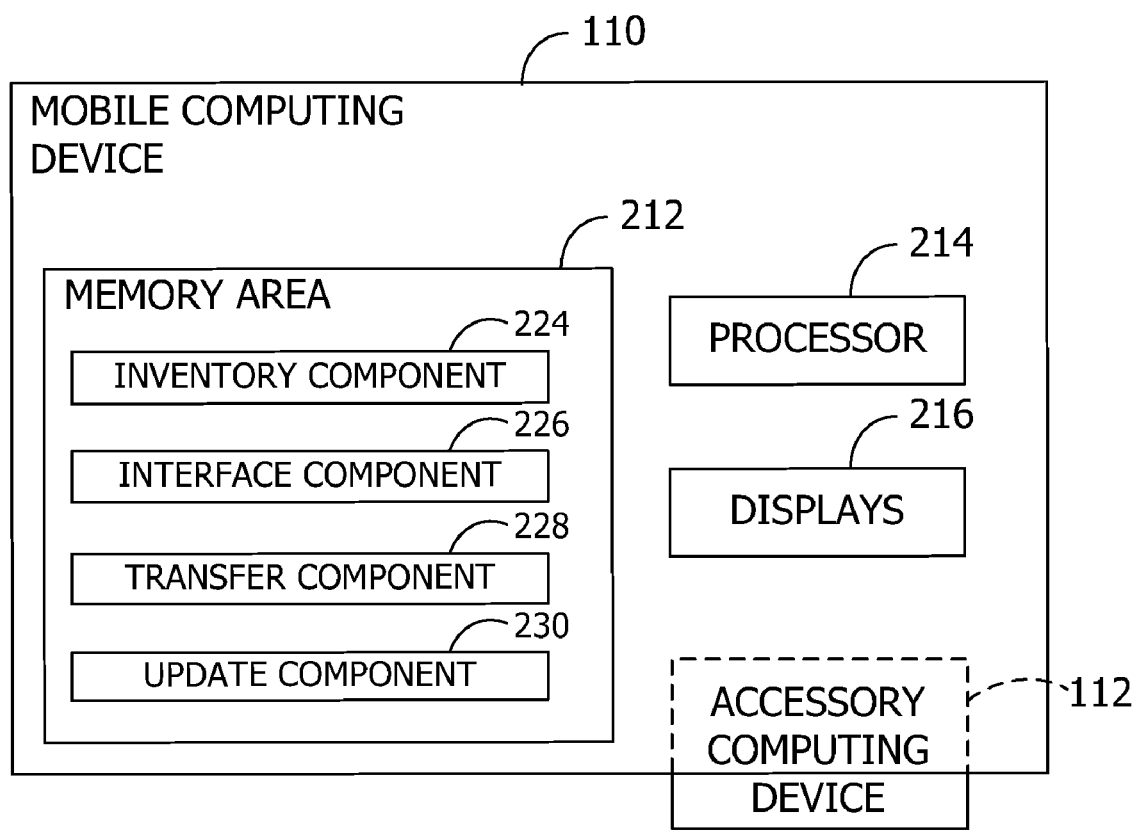
FIG. 2 is an exemplary block diagram of a mobile computing device having the accessory computing device attached thereto.
Figure 3:
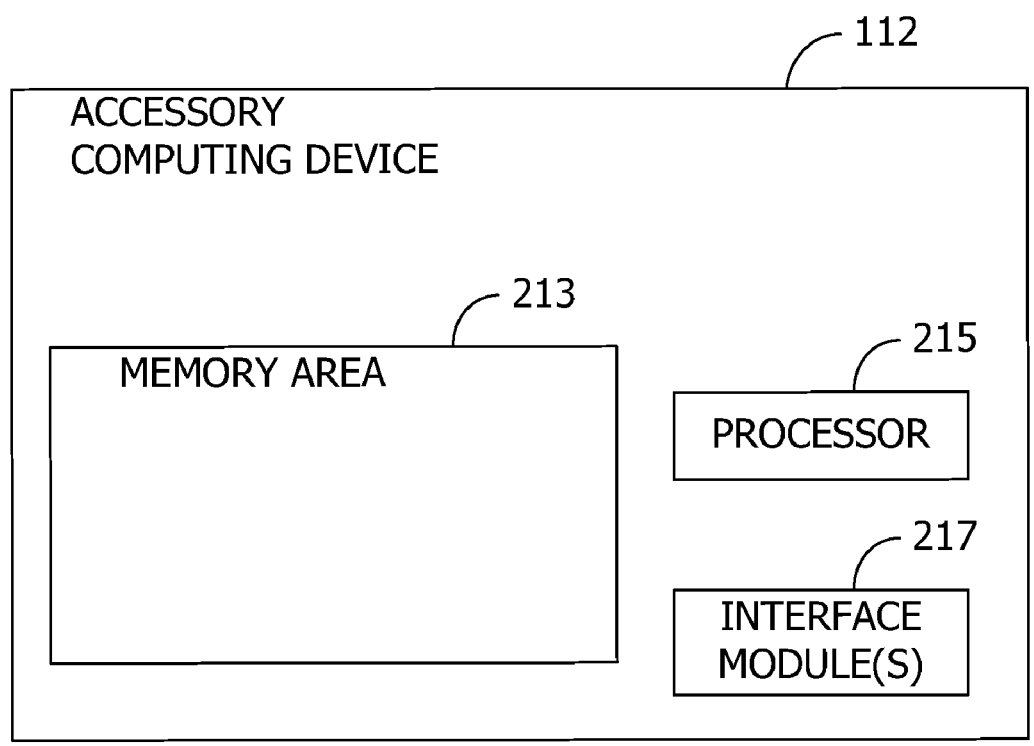
FIG. 3 is an exemplary block diagram of the accessory computing device storing computer-executable components for controlling another computing device.

Referring now to FIG. 2 and FIG. 3, mobile computing device 110 includes a memory area 212, at least one processor 214, and one or more displays 216 for displaying information to the user. Further, accessory computing device 112 includes a memory area 213, at least one processor 215, and one or more interface modules 217. The interface modules 217 enable the exchange of data between the user and the accessory computing device 112. For example, the interface modules 217 include one or more of the following: a capacitive touch screen display, a non-capacitive display, a speaker, and a user input selection device.

Although processors 214, 215 are shown separate from the memory areas 212, 213, embodiments of the disclosure contemplate that the memory areas 212, 213 may be onboard processors 214,215 such as in some embedded systems. Display 216 and interface module 217 provide presentation capabilities related to, for example, text, images, audio, video, graphics, alerts, and the like. The display 216 and interface module 217 present information ranging from low-resolution to high-resolution multimedia related not only to operation and functionality of mobile computing device 110 and accessory computing device 112, but also of connectivity status and functionality related to other electronic devices. Data connectivity capabilities of computing device 110 and accessory computing device 112 allow for an exchange of data between other mobile computing devices and computers. Additionally, the data connection capability allows mobile computing device 110 and/or accessory computing device 112 to be connected to other sources of data and media such as a laptop, desktop, a Motion Pictures Experts Group-1 Audio Layer 3 (MP3) player, a Motion Pictures Experts Group-4 Part 14 (MP4) player, gaming systems, or other gaming and media storage devices. This connectivity allows mobile computing device 110 and/or accessory computing device 112 to enable multi-player gaming among computing devices and the automatic sharing of media content, games, contacts, and more stored on one of the computing devices. For example, the accessory computing device 112 may be used to control a multi-player game executing on the mobile computing device 110. Another player links another accessory computing device to the mobile computing device 110 to participate in the game.

The diagrams of FIG. 2 and FIG. 3 are merely illustrative of an exemplary computing device and accessory computing device that can be used in connection with one or more embodiments of the disclosure, and is not intended to be limiting in any way. Further, peripherals or components of the computing device 110 known in the art are not shown, but are operable with aspects of the disclosure. For example, a speaker, printing component, vibrating component, or the like are contemplated.

Memory area 212 or other computer-readable media, stores computer-executable components. For example, memory area 212 stores computer-executable components for receiving data from the user, controlling the mobile computing device 110 based on the received data, and distributing messages/notifications between mobile computing device 110 and accessory component device 112. Therefore, if the user is in a meeting, the user may turn off mobile computing device 110 via accessory computing device 112 and route all information being received by mobile computing device 110 to accessory computing device 112. This allows the user to still receive information, for example, time, notifications, and messages, without requiring the user to access his/her mobile computing device. That is, accessory computing device 112 may be placed in front of the user on a table or desk because the accessory computing device is smaller and more discrete than mobile computing device 110 (see FIG. 5 and FIG. 6 for illustrative examples of mobile computing device 110 that includes a removably attached accessory computing device 112). In some embodiments, accessory computing device 112 is clipped to the user's clothing or personal articles (see FIG. 7).

Exemplary components stored in memory area 212 include, but are not limited to an inventory component 224, an interface component 226, a transfer component 228, and an update component 230. The inventory component 224 identifies one or more accessory computing devices 112 associated with mobile computing device 110. Each of the one or more accessory computing devices 112 is configured to be removably attached to mobile computing device 110. In embodiments, inventory component 224 may also identify one or more devices applicable to an application running on the mobile computing device 110. For example, if the one or more accessory computing devices 112 are used to control a game on the mobile computing device 110, the mobile computing device 110 synchronizes the one or more accessory computing devices to the mobile computing device 110.

Interface component 226 receives, from the user of mobile computing device 110, a selection of content to be stored on one or more of a plurality of the accessory computing devices 112. Interface component 226 may also include one or more of the following: a display, a touch screen, a speaker, and a user input selection device. The user may select a font type, font color, font size, and volume, as well as what notifications, messages, programs, applications, and data to present and be available to the user on accessory computing device 112. Therefore, the user has control as to what content and functionality to automatically display to the user, as well as what information on the mobile computing device can be accessed via the accessory computing device 112.

Transfer component 228 transfers the selection of content to the one or more accessory computing devices 112 prior to detachment of the accessory computing devices 112 from the mobile computing device 110. In some embodiments, the transfer occurs after the accessory computing devices 112 have been detached from mobile computing device 110 (e.g., the transmission occurs over a wireless connection). Therefore, after the user selects the content to be stored on the one or more accessory computing devices 112, transfer component 228 transfers the selected content to each of the one or more accessory computing devices 112. The selected content is then available on the accessory computing device 112, but the unselected content stored on the mobile computing device 110 is not available to the user through the accessory computing device 112.

In embodiments, after each of the one or more accessory computing devices 112 are re-attached to computing device 110, transfer component 228 automatically transfers any updates and/or new information applicable to the content stored on each of the one or more accessory computing devices. In further embodiments, these updates and/or new information are automatically transferred to each of the one or more accessory computing devices 112 whether or not each of the one or more accessory computing devices 112 are attached to mobile computing device 110. That is, the updates and/or new information are automatically transferred wirelessly.

Update component 230 communicates with each of the one or more detached accessory computing devices 112. For example, update component 230 provides the user with data associated with the selection of content for each of the accessory computing devices 112. For example, the user may designate that voice mail notifications be routed to a first accessory computing device, electronic mail messages be routed to a second accessory computing device, and stock price updates be routed to a third accessory computing device. In addition, the user may designate each of the accessory computing devices 112 to also display information to the user such as battery life, a location of the accessory computing device via a global positioning system (GPS), available memory, existing application programs, data, and the like. In embodiments, the user may designate the accessory computing device 112 to receive messages/notifications from a particular user or a particular group of users (e.g., a significant other, a child, or both). The accessory computing device 112 then filters messages to only display those from the particular user or group of users.

In embodiments, each of the accessory computing devices 112 includes GPS functionality to enable the mobile computing device 110 to track locations of the accessory computing devices 112. For example, a parent may give his/her children each an accessory computing device 112 that corresponds with the parent's mobile computing device 110. The parent may keep track of the children via the GPS functionality. In embodiments, the locations of the accessory computing devices 112 are presented to the parent on a map via display 216 on mobile computing device 110.

In embodiments, processors 214, 215 are transformed into a special purpose microprocessor by executing computer-executable instructions or by otherwise being programmed. For example, the processor 215 is programmed with instructions such as illustrated in FIG. 4.

With reference now to FIG. 4, data from mobile computing device 110 is received at 402 by accessory computing device 112, which is detached from the mobile computing device 110 in this example. In embodiments, the data includes, for example, an indication that an e-mail or text has been received by the mobile computing device 110. At 404, the received data is displayed to the user via the accessory computing device 112.

At 406, a command from the user of accessory computing device 112 is received via accessory computing device 112. An exemplary command from the user of accessory computing device 112 may be to decrease a volume of a ring on mobile computing device 110, or a command to move a character of a video game displayed on mobile computing device 110 that is controlled by accessory computing device 112. In addition, the user may have preset messages to be sent to an incoming caller that the user may command to send to the caller. For example, if a user of the mobile computing device 110 is notified of an incoming call via accessory computing device 112, the user may command computing device 110 to provide the caller with a preset message by selecting this option on the accessory computing device 112 via a toggle switch, a directional pad, a selection button, a radial button, a touch of the touch screen, and the like. The preset message may be a voice recording of the user indicating that the telephone cannot be answered because the user is, for example, "out to dinner" or "in a meeting."

At 408, the accessory computing device 112 controls mobile computing device 110 by communicating the received command to mobile computing device 110. In embodiments, accessory computing device 112 has a toggle switch, a directional pad, or touch screen to select and move through menu options on mobile computing device 110. Thus, if a command from accessory computing device 112 is to decrease a ring volume on computing device 110, the ring volume on computing device 110 is selected and decreased as commanded. Such functionality is also available if the accessory computing device 112 is attached to mobile computing device 110.

Figure 5A:
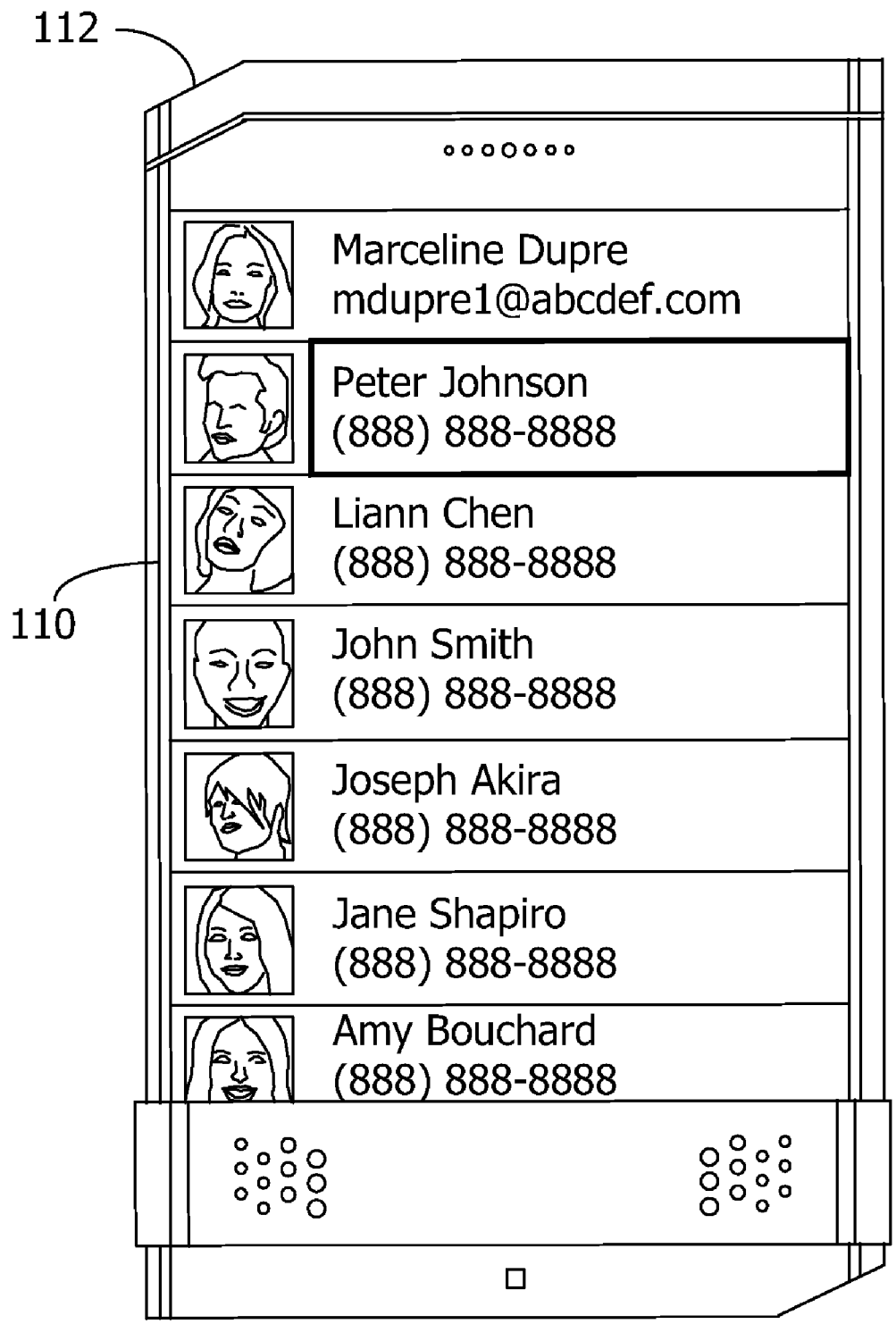
FIG. 5A is an exemplary embodiment of the mobile computing device with an accessory computing device attached thereto.

Referring next to FIG. 5A, the mobile computing device 110 has the accessory computing device 112 attached thereto. In such an embodiment, the accessory computing device 112 may still display notifications and other content, and control operation of the mobile computing device 114.

Figure 5B:
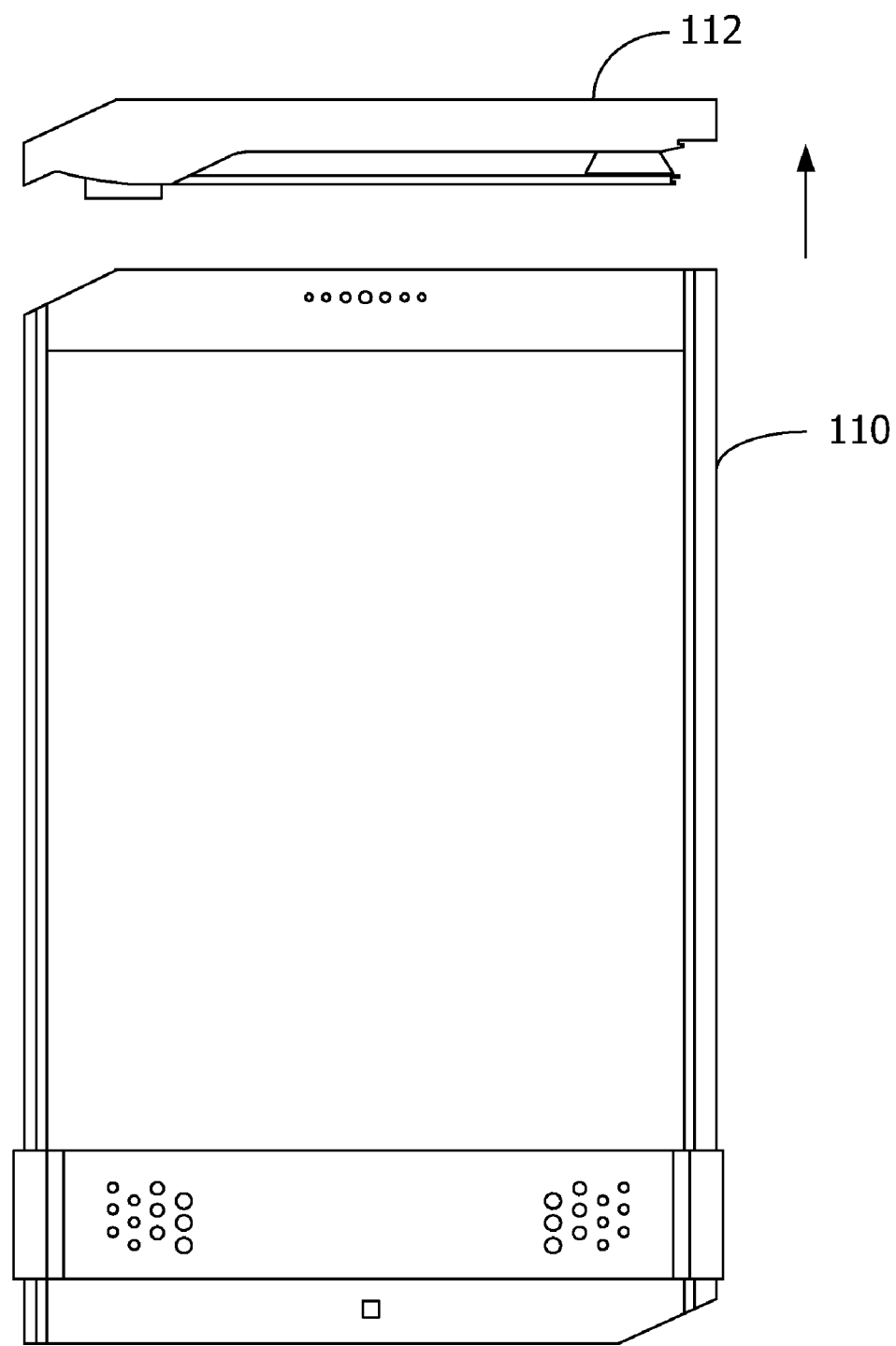
FIG. 5B is an exemplary embodiment of the mobile computing device with the accessory computing device detached.

Referring next to FIG. 5B, the accessory computing device 112 is detached from the mobile computing device 110. In such an embodiment, the user is able to use the accessory computing device 112 to control aspects of the mobile computing device 110.

Figure 6:
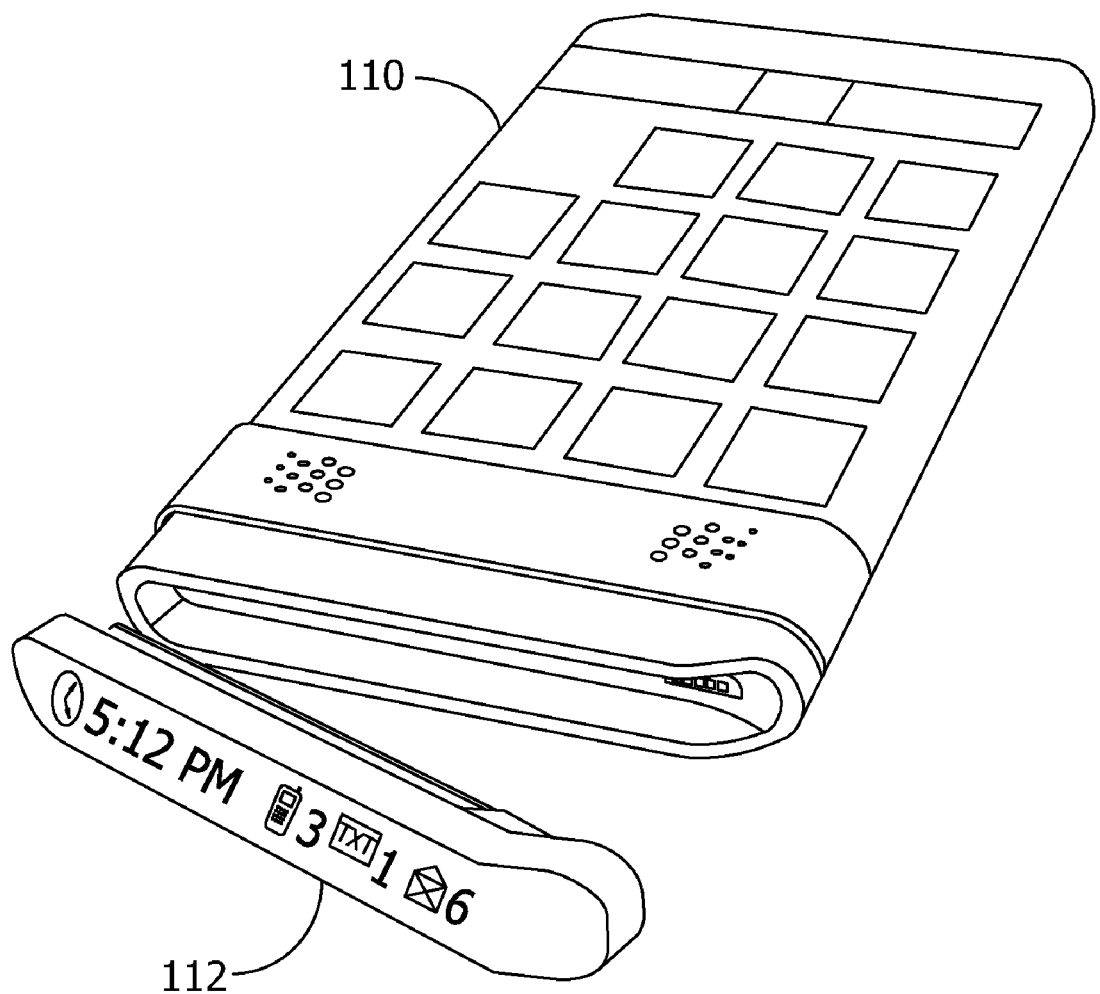
FIG. 6 is an exemplary embodiment of the accessory computing device detached from the mobile computing device and displaying notifications.

Referring next to FIG. 6, the accessory computing device 112 is shown detached from mobile computing device 110. The accessory computing device 112 displays notifications and other content to the user via the display 217.

Figure 7:
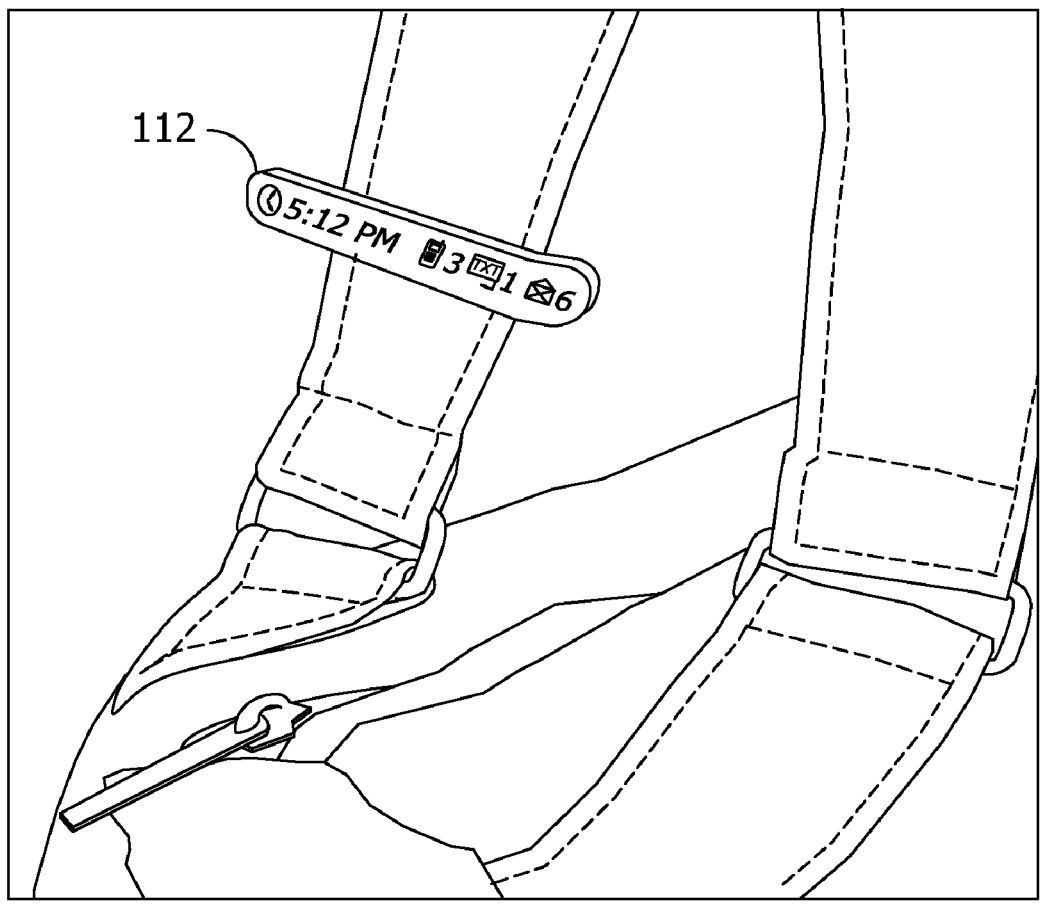
FIG. 7 is an illustrative example of the accessory computing device detached from a mobile computing device and clipped to a personal article.

Referring next to FIG. 7, the accessory computing device 112 has been removed from the mobile computing device 110, and is clipped to a purse. In the example of FIG. 7, the mobile computing device 110 may be locked inside the purse, or otherwise inaccessible.

Alternative Embodiments

In embodiments, mobile computing device 110 is configured to connect to an external monitor (e.g., to render content through the external monitor) and accessory computing device 112 is configured to control content being displayed from mobile computing device 110 to the external monitor (e.g., scroll through content or images or video, change channels, adjust volume, and the like). For example, FIG. 8 is an illustrative example of accessory computing device 112 being used to control external monitor 702. The user controls the content via a gesture or swipe on the accessory computing device 112, in some embodiments.

Figure 9:
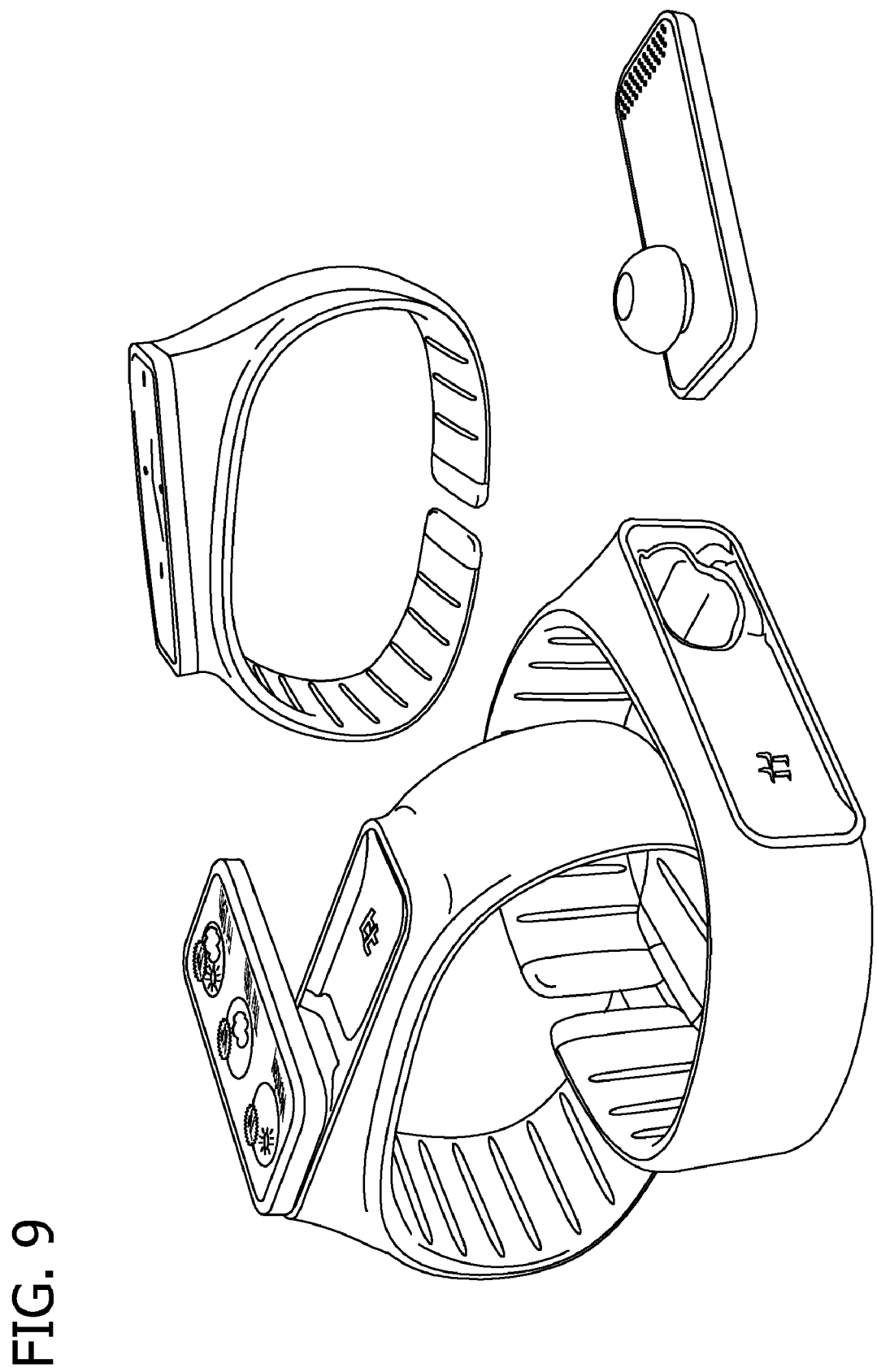
FIG. 9 is an illustrative example of the accessory computing device configured to be an earpiece.

In embodiments, accessory computing device 112 is configured to be an earpiece or headset or may be plugged into a headset. For example, FIG. 9 is an illustrative example of accessory computing device 812 configured to attach to a wrist worn article 902. However, when detached from wrist worn article 902, accessory computing device 912 is configured to be an earpiece as shown at 914. Accessory computing device may be linked to mobile computing device 110 via, for example BLUETOOTH wireless technology, allowing the user to scroll through notifications and applications while also acting as a BLUETOOTH earpiece that is configured to make and receive calls.

In further embodiments, accessory computing device 112 comprises a microphone, speaker, digital recorder, and any subset of the functionality of mobile computing device 110.

In embodiments, accessory computing device 112 includes an accelerometer that transmits data representing gestures to mobile computing device 110. The gestures correspond to and initiate an action performed on mobile computing device 110. In some embodiments, the data from the accelerometer indicates movement of the accessory computing device 112. The accessory computing device 112 transmits a command to mobile computing device 110 based on the data. The transmitted command causes the mobile computing device 110 to perform an action upon receipt of the transmitted command. For example, FIG. 10 is an illustrative example of accessory computing device 112 communicating with mobile computing device 110 utilizing an accelerometer as described above.

The accessory computing device 112 may also be used an electronic business card. In such embodiments, the accessory computing device 112 is adapted to connect to multiple computing devices. The user stores contact information or other selected information on the accessory computing device 112, then gives the accessory computing device 112 to another user (e.g., a business contact). The other user attaches the accessory computing device 112 to a computing device, and the contact information is uploaded to that computing device. In some embodiments, the accessory computing device 112 is used as a promotional tool by businesses and stores promotional content.

In an embodiment in which the mobile computing device 110 communicates with multiple accessory computing devices 112, the user of the mobile computing device 110 may designate the distribution of selected content to selected accessory computing devices 112. For example, the user may designate that electronic mail messages go a one particular accessory computing device 112, while another accessory computing device 112 receives missed call notifications.

In some embodiments, the accessory computing device 112 has a headset jack used to control music stored on the mobile computing device 110. For example, the mobile computing device 110 is in a bag, and the user clips the accessory computing device 112 to the shirt of the user. The user plugs headphones directly into the accessory computing device 112 and controls the music via the accessory computing device 112 by selecting tracks, adjusting volume, etc.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the disclosure are operational with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when configured to execute the instructions described herein.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for interacting with a mobile telephone, said system comprising:
a plurality of accessory computing devices removably attached to the mobile telephone, each of said accessory computing devices comprising:
an interface module for communication with a user of the accessory computing device;
a memory area for storing a selection of content associated with the accessory computing device and received from the mobile telephone prior to detachment of the accessory computing device from the mobile telephone, wherein the selection of content is different for each of the plurality of accessory computing devices; and
a processor programmed to:
receive from the user via the interface module, after detachment of the accessory computing device from the mobile telephone, a command to be performed by the mobile telephone to control execution of an application running on the mobile telephone, said command being based on user interaction with the selection of content stored in the memory area; and
transmit the command to the mobile telephone for performance of the command by the mobile telephone to control execution of the application running on the mobile telephone.

2. The system of claim 1, wherein the mobile telephone distributes notifications between the mobile telephone and one or more of the plurality of the accessory devices.

3. The system of claim 1, wherein one or more of the plurality of accessory computing devices comprises a global positioning system (GPS) transceiver.

4. The system of claim 1, wherein the accessory computing device comprises an accelerometer, and wherein the processor is further programmed to:
   receive data from the accelerometer indicating movement of the accessory computing device, said received data representing at least one gesture corresponding to an action to be performed by the mobile telephone; and
   transmit a command to the mobile telephone corresponding to the received data, wherein the transmitted command causes the mobile telephone to perform the action upon receipt of the transmitted command.

5. The system of claim 1, wherein the accessory computing device is a headset for use by the user.

6. The system of claim 1, wherein the accessory computing device further comprises at least one of the following: a microphone, a speaker, and a digital recorder.

7. A method comprising:
   receiving, by one of a plurality of accessory computing devices removably attached to a mobile telephone, a selection of content from the mobile telephone, each of said plurality of accessory computing devices storing a different selection of content received from the mobile telephone prior to detachment of the accessory computing device from the mobile telephone;
   displaying the received selection of content to a user of said one of the accessory computing devices;
   receiving, via said one of the accessory computing devices, a command from the user, said command being based on user interaction with the displayed selection of content; and
   instructing, by said one of the accessory computing devices, the mobile telephone to perform the received command to affect execution of an application running on the mobile telephone.

8. The method of claim 7, wherein the received selection of content is an indication that an electronic mail message or text has been received by the mobile telephone.

9. The method of claim 7, wherein the mobile telephone is configured to connect to an external monitor for displaying the received selection of content.

10. The method of claim 7, wherein receiving the command from the user of the accessory computing device comprises receiving one or more of the following: a command to power off the mobile telephone and a command to decrease a ringer volume of the mobile telephone.

11. The method of claim 7, wherein receiving the command from the user of the accessory computing device comprises receiving the command via one or more of the following: a toggle switch, a directional pad, a selection button, a radial button, and a touch screen.

12. One or more computer storage media having computer-executable components, said components comprising:
   an inventory component for identifying a plurality of accessory computing devices associated with a mobile telephone, wherein each of the plurality of the accessory computing devices are configured to be removably attached to the mobile telephone;
   an interface component for receiving, from a user of the mobile telephone, a selection of content to be associated with and stored on one or more of the plurality of accessory computing devices;
   a transfer component for transferring the selection of content to the plurality of the accessory computing devices prior to detachment of the accessory computing devices from the mobile telephone; and
   an update component for communicating with each of the plurality of detached accessory computing devices, wherein the update component provides, to the accessory computing devices, data related to the selection of content associated with each of the accessory computing devices,
   said mobile telephone receiving instructions from the accessory computing devices based on user interaction with the transferred selection of content to perform a command that affects execution of an application running on the mobile telephone.

13. The computer storage media of claim 12, wherein the inventory component identifies the plurality of accessory computing devices associated with an application program executing on the mobile telephone.

14. The computer storage media of claim 12, wherein the inventory component further receives identification of a location of each of the plurality of accessory computing devices.

15. The computer storage media of claim 12, wherein the interface component further receives from the user one or more of the following for text to be displayed on each of the plurality of accessory computing devices: a font type, font color, and/or a font size.

16. The computer storage media of claim 12, wherein the interface component receives the selection of content by receiving a selection of one or more of the following: a notification, a message, and an application program.

17. The computer storage media of claim 12, wherein the update component provides each of the plurality of detached accessory computing devices with data related to the selection of content associated with the accessory computing devices.

18. The computer storage media of claim 12, wherein the update component communicates with each of the plurality of detached accessory computing devices via a wireless connection.

* * * * *